US012092271B2

(12) United States Patent
Heijmans et al.

(10) Patent No.: US 12,092,271 B2
(45) Date of Patent: Sep. 17, 2024

(54) OPTICAL AND THERMAL IMPROVEMENT OF A TWO-SIDED MULTI-CHANNEL FILAMENT

(71) Applicant: SIGNIFY HOLDING B.V., Eindhoven (NL)

(72) Inventors: Martinus Arnoldus Cornelis Heijmans, Veldhoven (NL); Jan De Graaf, Uden (NL); Aldegonda Lucia Weijers, Eindhoven (NL); Eric Cornelis Egbertus Van Grunsven, Someren (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/284,926

(22) PCT Filed: Mar. 29, 2022

(86) PCT No.: PCT/EP2022/058207
§ 371 (c)(1),
(2) Date: Sep. 29, 2023

(87) PCT Pub. No.: WO2022/207603
PCT Pub. Date: Oct. 6, 2022

(65) Prior Publication Data

US 2024/0183501 A1 Jun. 6, 2024

(30) Foreign Application Priority Data

Apr. 1, 2021 (EP) .................................... 21166571

(51) Int. Cl.
*F21K 9/232* (2016.01)
*F21K 9/238* (2016.01)
(Continued)

(52) U.S. Cl.
CPC ........... *F21K 9/232* (2016.08); *F21Y 2107/90* (2016.08); *F21Y 2113/13* (2016.08); *F21Y 2115/10* (2016.08)

(58) Field of Classification Search
CPC .. F21K 9/232; F21Y 2107/90; F21Y 2113/13; F21Y 2115/10
See application file for complete search history.

(56) References Cited

U.S. PATENT DOCUMENTS 8,400,051 B2 3/2013 Hakata et al.
2013/0187528 A1 * 7/2013 Bailey ..................... F21V 29/74 313/111

(Continued)

FOREIGN PATENT DOCUMENTS

CN 111578167 A 8/2020
WO 2014013671 A1 1/2014

(Continued)

*Primary Examiner* — Tracie Y Green

(57) ABSTRACT

The invention provides an LED filament device (1000) comprising (i) a first LED filament side (1110), (ii) a second LED filament side (1120), (iii) an intermediate layer (440), and (iv) a plurality of sources of light (100), wherein: (a) first sources of light (110) are configured to generate first white light (111) having a first correlated color temperature CCT1; wherein the first sources of light (110) are associated to the first filament side (1110); (b) second sources of light (120) are configured to generate second white light (121) having a second correlated color temperature CCT2; wherein the second sources of light (120) are associated to the first filament side (1110); wherein CCT2−CCT1≥500 K; (c) third sources of light (130) are configured to generate blue third light (131); wherein the third sources of light (130) are associated to the second filament side (1120); (d) fourth sources of light (140) are configured to generate green fourth light (141); wherein the fourth sources of light (140) are associated to the second filament side (1120); (c) fifth (Continued)

sources of light (150) are configured to generate red fifth light (151); wherein the fifth sources of light (150) are associated to the second filament side (1120); (1) the intermediate layer (440) comprises a thermally conductive element (450); and (g) the first LED filament side (1110), the second LED filament side (1120), and (iii) the intermediate layer (440) are comprised by a sandwich arrangement (400), wherein the intermediate layer (440) is configured between at least part of the first LED filament side (1110) and at least part of the second LED filament side (1120).

15 Claims, 7 Drawing Sheets

(51) Int. Cl.

| | |
|---|---|
| ***H01L 33/60*** | (2010.01) |
| ***H05B 33/08*** | (2020.01) |
| *F21Y 107/90* | (2016.01) |
| *F21Y 113/13* | (2016.01) |
| *F21Y 115/10* | (2016.01) |

(56) References Cited

U.S. PATENT DOCUMENTS

| | | | |
|---|---|---|---|
| 2014/0175492 | A1 | 6/2014 | Steranka et al. |
| 2014/0362565 | A1 | 12/2014 | Yao et al. |
| 2018/0328543 | A1 | 11/2018 | Bergmann et al. |
| 2020/0212014 | A1 | 7/2020 | Chen et al. |
| 2020/0303356 | A1 | 9/2020 | Li et al. |
| 2022/0299172 | A1 * | 9/2022 | Wouters .................. F21K 9/232 |
| 2022/0390074 | A1 | 12/2022 | Van Der Lubbe et al. |

FOREIGN PATENT DOCUMENTS

| | | | |
|---|---|---|---|
| WO | 2016026153 | A1 | 2/2016 |
| WO | 2019197394 | A1 | 10/2019 |
| WO | 2020016058 | A1 | 1/2020 |
| WO | 2020152088 | A1 | 7/2020 |

* cited by examiner

OPTICAL AND THERMAL IMPROVEMENT OF A TWO-SIDED MULTI-CHANNEL FILAMENT

CROSS-REFERENCE TO PRIOR APPLICATIONS

This application is the U.S. National Phase application under 35 U.S.C. § 371 of International Application No. PCT/EP2022/058207, filed on Mar. 29, 2022, which claims the benefit of European Patent Application No. 21166571.6, filed on Apr. 1, 2021. These applications are hereby incorporated by reference herein.

FIELD OF THE INVENTION

The invention relates to a device as well as to a retrofit lamp, or other lighting device, comprising such device. The invention also relates to a LED filament device for such device.

BACKGROUND OF THE INVENTION

LED filament lamps are known in the art. US2018/0328543, for instance, describes a lamp comprising an optically transmissive enclosure for emitting an emitted light; a base connected to the enclosure; at least one first LED filament and at least one second LED filament in the enclosure operable to emit light when energized through an electrical path from the base, the at least one first LED filament emitting light having a first correlated color temperature (CCT) and the at least one second LED filament emitting light having a second CCT that are combined to generate the emitted light; and a controller that changes the CCT of the emitted light when the lamp is dimmed. The optically transmissive enclosure is transparent.

SUMMARY OF THE INVENTION

Incandescent lamps are rapidly being replaced by LED based lighting solutions. It may nevertheless be appreciated and desired by users to have retrofit lamps which have the look of an incandescent bulb. For this purpose, one may make use of the infrastructure for producing incandescent lamps based on glass and replace the filament with LEDs emitting white light. One of the concepts is based on LED filaments placed in such a bulb. The appearances of these lamps are highly appreciated as they look highly decorative.

Current LED filament lamps are not color controllable. For producing color controllable LED filament lamps one can make use of RGB LEDs on a (for instance translucent or transparent) substrate. However, such configuration may not provide a pleasant appearance. Other LED filament lamps may be color controllable, but may have relatively off-white colors. Further, LED filaments may have maintenance and/or stability problems at relatively high powers.

Hence, it is an aspect of the invention to provide an alternative light generating device, which preferably further at least partly obviates one or more of above-described drawbacks. The present invention may have as object to overcome or ameliorate at least one of the disadvantages of the prior art, or to provide a useful alternative. The present invention may have as object to provide a LED filament having an improved performance (e.g. in terms color and correlated color temperature control) and pleasant appearance.

In an aspect, the invention provides an LED filament device comprising (i) a first LED filament side, (ii) a second LED filament side, (iii) an intermediate layer, and (iv) a plurality of sources of light. The plurality of sources of light may comprise (two or more of) first sources of light, second sources of light, third sources of light, fourth sources of light, and fifth sources of light. Especially, the first sources of light may be configured to generate first white light having a first correlated color temperature CCT1. Especially, in embodiments the first sources of light are associated to the first filament side. Further, especially the second sources of light may be configured to generate second white light having a second correlated color temperature CCT2. Especially, in embodiments the second sources of light are associated to the first filament side. In specific embodiments, CCT2−CCT1≥500 K. Yet further, especially the third sources of light may be configured to generate blue third light. Especially, in embodiments the third sources of light are associated to the second filament side. Yet further, especially the fourth sources of light may be configured to generate green fourth light. Especially, in embodiments the fourth sources of light are associated to the second filament side. Further, especially the fifth sources of light may be configured to generate red fifth light. Especially, in embodiments the fifth sources of light may be associated to the second filament side. Further, especially the intermediate layer may comprise a thermally conductive element. Yet further, in embodiments the first LED filament side, the second LED filament side, and (iii) the intermediate layer may be comprised by a sandwich arrangement. Especially, the intermediate layer may be configured between at least part of the first LED filament side and at least part of the second LED filament side. Hence, especially in embodiments the invention provides an LED filament device comprising (i) a first LED filament side, (ii) a second LED filament side, (iii) an intermediate layer, and (iv) a plurality of sources of light, wherein: (a) first sources of light are configured to generate first white light having a first correlated color temperature CCT1; wherein the first sources of light are associated to the first filament side: (b) second sources of light are configured to generate second white light having a second correlated color temperature CCT2; wherein the second sources of light are associated to the first filament side: wherein CCT2−CCT1≥500 K; (c) third sources of light are configured to generate blue third light: wherein the third sources of light are associated to the second filament side: (d) fourth sources of light are configured to generate green fourth light: wherein the fourth sources of light are associated to the second filament side: (e) fifth sources of light are configured to generate red fifth light: wherein the fifth sources of light are associated to the second filament side: (f) the intermediate layer comprises a thermally conductive element; and (g) the first LED filament side, the second LED filament side, and (iii) the intermediate layer are comprised by a sandwich arrangement, wherein the intermediate layer is configured between at least part of the first LED filament side and at least part of the second LED filament side.

With the present invention it may be possible provide white light, which may in embodiments have a relatively low correlated color temperature (CCT). Further, with the present invention it may be possible to provide colored light. Yet, further, the color point of the light may be controllable. Further, with the present invention the color point of the white light may be closer to the black body locus (BBL) and/or the color rendering index (CRI) may be higher. Further, with the present invention visible light may be provided with within a relatively large color gamut. Further, with the present invention thermal management may be better, allowing longer lifetime and/or better performance and reliability. Further, with the present invention color mixing may be optimized. Further, with the present invention a LED filament (device) having an improved performance (e.g. in terms color and correlated color temperature control) and pleasant appearance is obtained. The reason is that the first white light having the first correlated color temperature and the second white light having the second correlated color temperature is provided by first and second sources of light (all) provided on the first filament side: while the blue third light, green fourth light and red fifth light is provided by third, fourth and fifth sources of light (all) provided on the second filament side. In this way, the different colors and different (correlated) color temperature are mixed/distributed well, while the LED filament has a pleasant appearance e.g. because it is (relatively) slim i.e. having a small diameter/width. Said two-sided multi-channel filament provides optical and/or thermal improvement.

As indicated above, in embodiments the invention provides an LED filament device comprising (i) a first LED filament side, (ii) a second LED filament side, (iii) an intermediate layer, and (iv) a plurality of sources of light.

In embodiments, the invention provides a LED filament device comprising a LED filament. Especially, the LED filament comprises a plurality of sources of light. In embodiments, the plurality of sources of light comprises first sources of light, second sources of light, third sources of light, fourth sources of light, and fifth sources of light. During operation, the LED filament device may provide filament device light ("device light") which may comprise the light of one or more of (these types of) sources of light.

As indicated above, the LED filament device is especially configured to generate filament device light (during operation of the LED filament device). The filament device light is especially the light that escapes from the LED filament device during operation of the LED filament device.

The LED filament device may comprise one or more LED filaments ("filaments"). The invention will in general further be described in relation to a single filament. However, as will be clear there may be more than one filament. Hence, the LED filament device may in specific embodiments comprise a plurality of LED filaments. When there is more than one filament, these may provide during an operational mode (in embodiments) light having different optical properties or light having essentially the same optical properties.

When there is more than one LED filament, the LED filaments may not necessarily be the same. For instance, there may be two or more LED filaments having different numbers of solid state light sources. Alternatively or additionally, there may be two or more LED filaments having different shapes. Alternatively or additionally, there may be two or more LED filaments configured to generate filament light having different spectral power distributions. Alternatively or additionally, there may be two or more LED filaments having different spectral power distribution turnabilities.

Further, there may be sets of LED filaments, wherein a set comprises two or more LED filaments which may be essentially identical, such as in number of solid state light sources and in filament light spectral power distribution, wherein the LED filaments within a set do (thus) essentially not mutually differ (in terms of spectral power distribution of the filament light), whereas LED filaments from different sets may mutually differ (especially in filament light spectral power distributions).

As indicated above, the invention provides a LED filament device comprising a LED filament. Especially, the LED filament comprises a plurality of sources of light. Herein, the term "source of light" is used when referring in embodiments to light sources, such as solid state light sources, of which the light is used as such, and in embodiments to combinations of light sources, such as solid state light sources, with luminescent material, wherein at least also the luminescent material light may be used. Hence, in specific embodiments the term "source of light" may refer to one or more of (i) a solid state light source, like a direct LED, (ii) a phosphor converted light source, like a PC LED, and (iii) a combination of a solid state light source and luminescent material, such as may be available in a light transmissive coating material wherein one or more solid state light sources are embedded. Hence, the plurality of sources of light especially comprises a plurality of solid state light sources. In specific embodiments, each source of light may comprise a solid state light source, such as a LED. Hence, when referring to pitches of sources of light below, this may especially refer to pitches of the respective solid state light sources.

The term "light source" may in principle relate to any light source known in the art. In a specific embodiment, the light source comprises a solid state LED light source (such as a LED or laser diode (or "diode laser")). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The terms "light source" or "solid state light source" may also refer to a superluminescent diode (SLED).

The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and (at least) part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. Such LEDs may be indicated as phosphor converted LEDs or PC LEDs. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the (optional) luminescent material.

In embodiments, the light source may be selected from the group of laser diodes and superluminescent LEDs. In other embodiments, the light sources comprises LEDs.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation. Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCaO(BO_3)_3$ or Nd:YCOB, neodymium doped yttrium orthovanadate (Nd:YVO4) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3:Cr^{3+}$), thulium YAG (Tm:YAG) laser, titanium sapphire (Ti:sapphire; $Al_2O_3:Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The filament may comprise a support and solid state light sources, supported by the support. Especially, the filament may comprise a (light transmissive) encapsulant which may at least partly enclose the solid state light source(s), especially at least enclose the light emitting surface(s) of the solid state light sources(s), such as the die(s).

The LED filament may in embodiments comprises a support, a set of solid state light sources ("light sources"), and an encapsulant. The LED filament may have a length axis having a first length (L1). Especially, the solid state light sources are arranged over the first length (L1) of the LED filament on the support. Further, the solid state light sources are configured to generate light source light (during operation of the light generating device). Especially, in embodiments the encapsulant encloses at least part of each of the solid state light sources of the set of solid state light sources. In general, the filaments may have aspect ratios of length and width, and of length and height, of at least 10, such as selected from the range of 10-10,000. The aspect ratios of different filaments may in specific embodiments differ, though in embodiments the aspect ratios may essentially be the same. Note that for a filament the aspect ratio of the length and width and the aspect ratio of the length and height may differ.

The support may in embodiments comprise one or more of (metal) leads and resin (material). In specific embodiments, the support may comprise a flexible PCB. In specific embodiments, the support may comprise a polymeric support, e.g. a polyimide support. In specific embodiments, the support may comprise a light transmissive polymeric support. The support may be flexible. In embodiments, the support may comprise a foil. Further, in embodiments the encapsulant may comprise a luminescent material configured to convert at least part of the light source light into luminescent material light. Alternatively or additionally, one or more of the one or more solid state light sources may comprise a luminescent material, and the encapsulant may in embodiments be transparent or translucent.

Yet alternatively or additionally, the solid state light sources may be configured to generate solid state light source light without conversion material comprised by the solid state light source, i.e. the light of the solid state light source may have a spectral power distribution essentially the same as escaping from the die. Also in such embodiments, the (optional) encapsulant may in embodiments be transparent or translucent.

Especially, the filament may be configured to generate filament light (during an operational mode of the respective filament). The filament light may comprise one or more of luminescent material light and solid state light source light (of solid state light sources without luminescent material). The luminescent material light may be from PC solid state light sources, i.e. phosphor converter solid state light sources, or from luminescent material in the encapsulant. Solid state light sources without luminescent material may herein also be indicated as non-PC solid state light sources or direct color LEDs.

As indicated above, the LED filament device may comprise an LED filament, wherein the LED filament comprises a support, a set of solid state light sources, and an encapsulant.

The number of (solid state) light sources in the LED filament may be at least 20, such as at least 24, like at least 40, such as at least 48, and may e.g. be up to 100, or yet even larger. Especially, in embodiments the number of (solid state) light sources in the set may be selected from the range of 20-1000, such as 10-200.

Hence, in embodiments one or more sources of light may each comprise a solid state light source. Alternatively or additionally, in embodiments one or more sources of light may each comprise a solid state light source with a luminescent material, i.e. in embodiments PC LEDs.

Especially, in embodiments there are at least five different sources of light, which may be used to generate light having mutually different spectral power distributions. Hence, in embodiments the plurality of sources of light comprises first sources of light, second sources of light, third sources of light, fourth sources of light, and fifth sources of light may be available. Especially, the invention is described in relation to first sources of light, second sources of light, third sources of light, fourth sources of light, and fifth sources of light. However, other embodiments with more sources of light, or with less sources of light, or with different combinations of sources of light may also be possible (see also below).

Herein, amongst others two main embodiments may be available. In a series of embodiments, two LED filaments may be applied, which may be associated to each other, with especially at each LED filament a single side with solid state light sources. Hence, a sandwich arrangement may be provided, which may in embodiments comprise a first LED filament and a second LED filament, with optionally an intermediate layer in between. One filament may provide the first filament side and the other filament may provide the second filament side. In this way a sandwich arrangement may be provided, wherein the first filament side and the second filament side may provide a top side or face of the sandwich arrangement and the bottom side or face of the sandwich arrangement. In another series of embodiments, a single LED filament may be applied with in general at one side all the solid state light sources, which may be folded to provide a folded filament with optionally an intermediate layer in between. One part of the filament may provide the first filament side and the other part filament, opposite of the one part, may provide the second filament side. Also in this way a sandwich arrangement may be provided, wherein the first filament side and the second filament side may provide a top side or face of the sandwich arrangement and the bottom side or face of the sandwich arrangement.

Instead of the term sandwich arrangement, also the term sandwich LED filament may be used. The sandwich may especially be defined by a single LED filament (which is folded to a sandwich arrangement) or by two LED filaments (which are configured in a sandwich arrangement). The sandwich arrangement may thus comprise at one side the first filament side, and at another side the second filament side.

Especially, the sources of light are configured in an array with 2-3 columns at first filament side and in an array with 2-3 columns at the second filament side. This may allow a relatively narrow filament which may be more flexible and/or may be easier to produce and/or to apply.

Especially, at the first LED filament side warm white and cool white sources of light may be provided, and at the second LED filament side RGB sources of light may be provided. However, other embodiments may also be possible.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

Especially, the first sources of light may be configured to generate first white light having a first correlated color temperature CCT1. Further, the first sources of light are associated to the first filament side. Hence, the first sources of light may be functionally coupled to the first filament side. Especially, the second sources of light may be configured to generate second white light having a second correlated color temperature CCT2. Hence, in embodiments the spectral power distributions of the first white light and the second white light are different. Further, the second sources of light are associated to the first filament side. Hence, the second sources of light may (also) be functionally coupled to the first filament side.

Especially, the first sources of light provide warmer white and the second sources of light provide cooler light. Hence, in embodiments CCT2−CCT1≥500 K. In specific embodiments, CCT1 may be selected from the range of at maximum 2400 K, and in specific embodiments CCT2 may be selected from the range of at least 2300 K, such as especially at least 2700. Especially, in embodiments CCT2−CCT1≥500 K may apply. In embodiments CCT1 may be selected from the range of at maximum 2400 K, and CCT2 is selected from the range of at least 2700 K. In further specific embodiments CCT2 may be at least 3000 K, such as at least 3500 K. Even more especially, CCT2 is at least 4000 K. In embodiments, CCT2 may be selected from the range of 2700-4000 K. In specific embodiments, CCT1 is selected from the range of 1700-2400 K, such as selected from the range of 1900-2300 K, and CCT2 is selected from the range of 2500-6500 K, such as selected from the range of 3000-4500K. Especially, in embodiments CCT2−CCT1≥1000 K. In specific embodiments, CCT1 is selected from the range of at maximum 1900-2400 K, CCT2 is selected from the range of 2700-6500 K, and CCT2−CCT1≥1000 K. Even more especially, in embodiments CCT2−CCT1≥2000 K. This may allow a relatively large tunability of the CCT.

Further, especially the third sources of light may be configured to generate blue third light. In embodiments, the third sources of light are associated to the second filament side. Hence, the third sources of light may be functionally coupled to the second filament side. Especially, a majority of all third sources of light are associated to the second filament side. More especially, at least 90% of the total number of all third sources of light are associated to the second filament side. Yet even more especially, of all third sources of light are associated to the second filament side.

Further, especially the fourth sources of light may be configured to generate green fourth light. In embodiments, the fourth sources of light are associated to the second filament side. Hence, the fourth sources of light may be functionally coupled to the second filament side. Especially, a majority of all fourth sources of light are associated to the second filament side. More especially, at least 90% of the total number of all fourth sources of light are associated to the second filament side. Yet even more especially, of all fourth sources of light are associated to the second filament side.

Further, especially the fifth sources of light may be configured to generate red fifth light. In embodiments, the fifth sources of light are associated to the second filament side. Hence, the fifth sources of light may be functionally coupled to the second filament side. Especially, a majority of all fifth sources of light are associated to the second filament side. More especially, at least 90% of the total number of all fifth sources of light are associated to the second filament side. Yet even more especially, of all fifth sources of light are associated to the second filament side.

The terms "visible", "visible light" or "visible emission" and similar terms refer to light having one or more wavelengths in the range of about 380-780 nm. Herein, UV may especially refer to a wavelength selected from the range of 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light. The terms "violet light" or "violet emission" especially relates to light having a wavelength in the range of about 380-440 nm. The terms "blue light" or "blue emission" especially relate to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-590 nm. The terms "orange light" or "orange emission" especially relate to light having a wavelength in the range of about 590-620. The terms "red light" or "red emission" especially relate to light having a wavelength in the range of about 620-750 nm. The term "cyan" may refer to one or more wavelengths selected from the range of about 490-520 nm. The term "amber" may refer to one or more wavelengths selected from the range of about 585-605 nm, such as about 590-600 nm.

Hence, the third sources of light may in embodiments provide blue light, especially having a centroid wavelength within the range of 440-490 nm, even more especially having a centroid wavelength within the range of about 440-480 nm. Especially, the third light sources are solid state light sources.

Hence, the fourth sources of light may in embodiments provide green light, especially having a centroid wavelength within the range of 520-560 nm. Alternatively or additionally, in embodiments the fourth sources of light may provide cyan light, especially having a centroid wavelength within the range of 490-520 nm. Therefore, in embodiments the fourth sources of light may comprise one or more types of fourth sources of light, configured to generate light having one or more centroid wavelengths within the wavelength range of about 490-560 nm. Especially, the fourth light sources are solid state light sources. In other embodiments, the fourth sources of light may be configured to generate cyan-green light selected from the range of about 480-560 nm. For instance, in embodiments the fourth sources of light may comprise one or more types of fourth sources of light, configured to generate light having one or more centroid wavelengths within the wavelength range of about 480-560 nm.

In embodiments, the fifth sources of light may be configured to generate red light having one or more wavelengths selected from the wavelength range 620-750 nm, even more especially 620-650 nm, more especially from the wavelength range of 620-640 nm. In specific embodiments, the fifth sources of light may be configured to generate red light having peak wavelengths selected from the wavelength range 620-650 nm, more especially from the wavelength range of 620-640 nm. In specific embodiments, the fifth sources of light may be configured to generate red light having centroid wavelengths selected from the wavelength range 620-650 nm, more especially from the wavelength range of 620-640 nm. In embodiments, the fifth sources of light comprise fifth light sources, wherein the fifth light sources are configured to generate fifth light source light having peak wavelengths and/or centroid wavelengths, selected from the wavelength range 620-650 nm, more especially from the wavelength range of 620-640 nm. Especially, the fifth light sources are solid state light sources.

The term "centroid wavelength", also indicated as λc, is known in the art, and refers to the wavelength value where half of the light energy is at shorter and half the energy is at longer wavelengths: the value is stated in nanometers (nm). It is the wavelength that divides the integral of a spectral power distribution into two equal parts as expressed by the formula $\lambda c=\Sigma\lambda^*I(\lambda)/(\Sigma I(\lambda)$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

The third light, the fourth light, and the fifth light may have different centroid wavelengths. The mutual distances between the centroid wavelengths may in embodiments be at least 20 nm, such as especially at least 30 nm.

In embodiments, the LED filament may be based on blue light emitting solid state light sources and green light emitting solid state light sources, and red light emitting solid state light sources, in addition to white light emitting sources of light. The white light emitting sources of light may especially be based on blue light emitting solid state light and respective luminescent materials (leading to warm white and cool white light, respectively.

Instead of green light emitting solid state light sources, also a blue light emitting solid state light source in combination with a green light luminescent material may be applied. Likewise, instead of red light emitting solid state light sources, also a blue light emitting solid state light source in combination with a red light emitting luminescent material may be applied.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion. In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$). In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials.

In specific embodiments, luminescent materials that are applied to provide white light emitting source of light may be selected from the group of luminescent materials of the type $A_3B_5O_{12}$:Ce, wherein A comprises one or more of Y, La, Gd, Tb and Lu, and wherein B comprises one or more of Al, Ga, In and Sc.

Hence, the sources of light may comprise solid state light sources. Further, one or more sources of light may comprise a luminescent material. The luminescent material may be comprised by the solid state light source, like a PC LED, or may be configured downstream of the solid state light source, like a direct LED with luminescent material configured downstream of the LED, like in a light transmissive material (wherein the luminescent material may be embedded).

In embodiments, the LED filament device, more especially the sandwich LED filament, may comprise at least five of each of the first sources of light, the second sources of light, the third sources of light, the fourth sources of light, and the fifth sources of light. More especially, in embodiments each of the first sources of light, the second sources of light, the third sources of light, the fourth sources of light, and the fifth sources of light comprise solid state light sources. Further, in embodiments the first sources of light and the second sources of light may be configured in two parallel rows (461, 462). Yet further, in embodiments the third sources of light, the fourth sources of light, and the fifth sources of light may be configured in two or three parallel rows (463, 464, 465).

The first sources of light may have a first pitch p1. The second sources of light may have a second pitch p2. Especially, in embodiments $0.5\leq p1/p2\leq 2$, more especially $0.75\leq p1/p2\leq 1.25$, yet even more especially $0.9\leq p1/p2\leq 1.1$, such as $p1/p2=1$.

Further, the third sources of light may have a third pitch p3. The fourth sources of light may have a fourth pitch p4. The fifth sources of light may have a fifth pitch p5. In embodiments, $0.5\leq p4/p3\leq 2$, more especially $0.75\leq p4/p3\leq 1.25$, yet even more especially $0.9\leq p4/p3\leq 1.1$, such as $p4/p3=1$. Further, in embodiments $0.5\leq p5/p3\leq 2$, more especially $0.75\leq p5/p3\leq 1.25$, yet even more especially $0.9\leq p5/p3\leq 1.1$, such as $p5/p3=1$. Yet further in embodiments, $0.5\leq p5/p4\leq 2$, more especially $0.75\leq p5/p4\leq 1.25$, yet even more especially $0.9\leq p5/p4\leq 1.1$, such as $p5/p4=1$. The third sources of light, the fourth sources of light, and the fifth sources of light may in embodiments be distributed over two columns, especially equally distributed. In other embodiments, the third sources of light, the fourth sources of light, and the fifth sources of light may in embodiments be distributed over three columns. In the latter embodiments, each column may comprise a single type of the third sources of light, the fourth sources of light, and the fifth sources of light, or each column may comprise two or three of the types of the third sources of light, the fourth sources of light, and the fifth sources of light.

The pitches may be selected from the range of 0.02-10 mm, such as selected from the range of 0.02-5 mm, such as selected from the range of 0.05-2 mm. The shortest distance between the solid state light sources in a column may in embodiments be ≤3 mm, more especially ≤2 mm, most especially ≤1 mm. Otherwise spottiness may be observed. This is particular the case when solid state light sources are used which emit different colors. The length and width of the solid state light sources may especially be ≤1 mm, more especially ≤0.8 mm, most especially ≤0.7 mm. Especially smaller solid state light sources may be used because not so much light may be needed given the large number of solid state light sources. Small solid state light sources (less epi) may be cheaper. The pitch between the solid state light sources in a column may in embodiments be especially ≤3 mm, more especially ≤2 mm, most especially ≤1 mm (see above). The shortest distance between solid state light sources in different columns may be small because the architecture may mimic a single filament. The distance may in embodiments be ≤3 mm, more especially ≤2 mm, most especially ≤1 mm. The shortest distance between the solid state light sources in a column may be about the same as the shortest distance between the solid state light sources in different columns.

In embodiments, the number of third sources of light, the fourth sources of light, and the fifth sources of light may be about equal. Hence, especially in embodiments a number n3 of third sources of light, a number n4 of fourth sources of light, and a number n5 of fifth sources of light may mutually differ at maximum within 15% of an average value for n3, n4, and n5 (i.e. an average value for n3+n4+n5).

As indicated above, in embodiments a sandwich arrangement may be provided, which may in embodiments comprise a first LED filament and a second LED filament, with optionally an intermediate layer in between. In other embodiments, a single LED filament may be applied with in general at one side all the solid state light sources, which may be folded to provide a folded filament with optionally an intermediate layer in between.

Especially, in embodiments the intermediate layer may comprise a thermally conductive element. The thermally conductive element may facilitate heat dissipation and/or heat spreading. In this way, the lifetime of the device may be longer and/or the spectral properties may be more stable over a larger electrical power range.

Hence, especially the first LED filament side, the second LED filament side, and (iii) the intermediate layer may be comprised by a sandwich arrangement, wherein the intermediate layer is configured between at least part of the first LED filament side and at least part of the second LED filament side.

The third sources of light, fourth sources of light, and fifth sources of light may be used to generate white light as such or to generate light to further tune the white light of the first sources of light and/or second sources of light. It appears useful when two or more of the third sources of light, fourth sources of light, and fifth sources of light are at least partly enclosed by a light transmissive material. This may protect the sources of light or the solid state light sources, but this may in embodiments also facilitate light mixing, especially when the light transmissive material scatters at least part of the light. Hence, in embodiments light of one or more, especially two or more, even more especially all three of the third sources of light, fourth sources of light, and fifth sources of light, may at least partly be enclosed by the light transmissive material. Hence, one or more of third light source, fourth light sources, and fifth light sources may at least partly be embedded by the light transmissive material. Hence, in embodiments one or more of third light source, fourth light sources, and fifth light sources may at least partly be embedded by an encapsulant comprising light transmissive material. The encapsulant may encapsulate one or more different types of light sources. In embodiments, there may be two or more different encapsulants, like a first encapsulant comprised by the first sources of light, a second encapsulant comprised by the second sources of light, and one or more encapsulants encapsulating one or more of the third sources of light, the fourth sources of light and the fifth sources of light.

The phrase "one or more encapsulants encapsulating one or more of the third sources of light, the fourth sources of light and the fifth sources of light" may refer to different embodiments, including embodiments of as single encapsulant enclosing all three types, embodiments of a single encapsulant enclosing two different types, a single encapsulant enclosing a single type, and embodiments of a first encapsulant enclosing two types of sources of light and a second encapsulant enclosing another of the types of the sources of light.

In embodiments the fourth sources of light and fifth sources of light may at least partly be enclosed by the light transmissive material. In yet other embodiments, the third sources of light, the fourth sources of light, and the fifth sources of light. Hence, especially in embodiments the LED filament device may further comprise a light transmissive material, wherein the fourth sources of light and the fifth sources of light, and optionally the third sources of light, are configured at least partly embedded in the light transmissive material. Especially, the light transmissive material is transmissive for the blue third light, the green fourth light, and the red fifth light. Further, in specific embodiments the light transmissive material is translucent. For instance, at least 20%, such as at least 30% of the light of one or more of the third sources of light, fourth sources of light, and fifth sources of light, that enters the light transmissive material will only escape therefrom (at the downstream side) via at least one scattering. In specific embodiments, the light transmissive material comprises a silicone material comprising scattering particles. Characteristic particle sizes are known from the prior art and may e.g. in embodiments be selected from the range of 0.5-50 μm, though other dimensions may also be possible.

As indicated above, the intermediate layer may have thermally conductive properties. A thermally conductive element especially comprise thermally conductive material. A thermally conductive material may especially have a thermal conductivity of at least about 20 W/(m*K), like at least about 30 W/(m*K), such as at least about 100 W/(m*K), like especially at least about 200 W/(m*K). In yet further specific embodiments, a thermally conductive material may especially have a thermal conductivity of at least about 10 W/(m*K). In embodiments, the thermally conductive material may comprise of one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide. Hence, to this in embodiments the intermediate layer comprises a metal layer. In specific embodiments, the intermediate layer comprises one or more of (i) a copper layer and (ii) an aluminum layer. In yet other embodiments, the thermally conductive layer may comprise a carbon layer, such as carbon nanotubes, graphene, etc. Hence, in specific embodiments the intermediate layer may comprise a carbon layer. A carbon comprising layer may also be thermally conductive. For instance, a thermally conductive material may be applied based on a material with particles embedded therein, like ceramic particles or carbon nanoparticles, like carbon nanotubes. As thermally conductive material may in embodiments also be electrically conductive, such as a metal layer, in embodiments the thermally conductive element, especially the metal layer, and the sources of light may not be configured in electrically conductive contact. Hence, especially the thermally conductive element may not be part of the electrical circuit.

As the third sources of light, fourth sources of light, and fifth sources of light may be used to further control the color point, it may be useful when part of the light of these sources of light may directly escape from the other side. Likewise, it may be useful that part of the white light from the first sources of light and/or of the second sources of light may directly escape from the other side. In other words, even though configured at one of the two filament side, part of the light of the respective source(s) of light of the sources of light associated to the specific filament side may escape via the other of the two filament sides. To this end, it may be desirable that the support(s) may transmit light and that the (optional) intermediate layer may transmit light.

However, it also appears useful when blue light of the third sources of light may not or may to a lower extend escape via the other side. This may reduce excitation of the luminescent material of the first sources of light and/or second sources of light, which may change the color point, and/or other optical properties of the LED filament light, in an non-desired way. To a lesser extent, or essentially not, this may also apply to the light of the fourth sources of light. Hence, in embodiments the intermediate layer may be one or more of (i) reflective and (ii) light absorbing for one or more of (a) the blue third light and (b) the green fourth light. Especially, the intermediate layer may be one or more of (i) reflective and (ii) light absorbing for at least the blue third light and optionally the green fourth light. Even more especially, in embodiments the thermally conductive element may be one or more of (i) reflective and (ii) light absorbing for one or more of (a) the blue third light and (b) the green fourth light. Hence, especially, the thermally conductive element may be one or more of (i) reflective and (ii) light absorbing for at least the blue third light and optionally the green fourth light.

Further, as indicated above, in specific embodiments the intermediate layer may be chosen such that at least part of the light generated at one side may escape from the LED filament (LED filament sandwich arrangement) at the other side. Hence, e.g. in embodiments the intermediate layer may comprise light transmissive part, such as defined by openings or light transmissive material.

Especially, (on the one hand) the intermediate layer and the third source of light may be configured such, that relatively less third light may propagate to the other side, than this may apply for the fifth light, and optionally the fourth light. Hence, in embodiments an elongate of the optical axis of the third source of light may intercept the thermally conductive element. As will be further elucidate below, the intermediate layer, and in more specific embodiments the thermally conductive element, may be configured such that there are one or more openings in the thermally conductive element (or between thermally conductive element part). Hence, especially in embodiments an elongate of the optical axis of the third source of light may not intercept such opening in the thermally conductive element (or between thermally conductive element part).

Further, as indicated above, (on the other hand) the intermediate layer and the first source of light and/or second source of light may be configured such that part of the first light and/or second light generated at one side may escape from the LED filament (LED filament sandwich arrangement) at the other side. Therefore, in embodiments the LED filament device comprising the intermediate layer may be configured such that part of one or more of the first white light, second white light may escape from the sandwich arrangement via the second LED filament side. As will be further elucidated below, this may be achieved in embodiments wherein the intermediate layer, and in more specific embodiments the thermally conductive element, may be configured such that there are one or more openings in the thermally conductive element (or between thermally conductive element part). Instead of openings also light transmissive material (such as light transmissive polymeric material) may be used. This light transmissive material may be transparent or translucent. Hence, in specific embodiments the intermediate layer may not fully transmissive or opaque (reflective) but partially at some locations transmissive and partially at some places reflective.

As indicated above, in specific embodiments the sandwich arrangement may be provided by a single LED filament. Therefore, in specific embodiments the LED filament device may comprise a LED filament, wherein the LED filament is configured fold in half, defining the first LED filament side and the second LED filament side configured opposite of each other. In such embodiments, the intermediate layer may be configured between at least part of the first LED filament side and at least part of the second LED filament side. Especially, in such embodiments the LED filament comprises a support to which solid state light sources are attached to one side. The support has a first side, to which the solid state light sources are attached and a second side, to which no solid state light sources may be attached. The support may be configured fold in half, by which a folded LED filament is provided, which has a first LED filament side with a subset of the solid state light sources and a second filament side with another subset of the light sources. However, in fact the first LED filament side and the second filament side are the same side of a shared support.

To allow light propagate from one LED filament side to another LED filament side, the support may transmit at least part of the light. Hence, the support may comprise a light transmissive material (like e.g. flexfoil). Therefore, in specific embodiments the LED filament comprises a support, wherein at least part of the support is light transmissive for one or more of the first white light and the second white light. Especially, the intermediate layer may be configured between part of the first LED filament side and part of the second LED filament side. Effectively, the LED filament may be folded at least partly around the intermediate layer, such as the thermally conductive layer. The folding is especially along a length axis of the LED filament.

In other embodiments, to provide the sandwich arrangement, two LED filaments may be applied. Especially, in such embodiments the LED filaments comprise respective supports to which respective solid state light sources are attached to especially one side of each of the respective supports. The supports have a first side, to which the solid state light sources are attached and a second side, to which no solid state light sources may be attached. The two supports may be configured to each other by functionally coupling the sides without the solid state light sources to each other, with the intermediate layer configured between. Thereby, (sandwich) LED filament is provided, which has a first LED filament side provided by the one LED filament, and which has a second LED filament side provided by the other of the LED filaments. Therefore, in specific embodiments the LED filament device comprises a first LED filament (1100') defining the first LED filament side and a second LED filament (1100") defining the second LED filament side, wherein the first filament and the second filament (1100") are comprised by the sandwich arrangement. Especially, the intermediate layer, more especially the thermally conductive layer, may be configured between at least part of the first LED filament side and at least part of the second LED filament side.

To allow light propagate from one LED filament side to another LED filament side, the supports of both LED filaments may transmit at least part of the light. Hence, the supports may comprise a light transmissive material. Therefore, in embodiments the first LED filament (1100') and the second LED filament (1100") comprise supports, wherein at least part of each of the supports are light transmissive for one or more of the first white light and the second white light. Especially, as indicate above, the intermediate layer is configured between part of the first LED filament (1100') and part of the second LED filament (1100"). For instance, the support(s) may comprise light transmissive polymeric material.

Hence, the one or more supports, and the intermediate layer may be configured such that part of the light of one or more of the sources of light may escape from the (sandwich) LED filament from another LED filament side than where the source of light is configured.

The amount of light that may escape from an opposite LED filament side may be within the range of about 0.5-25%, such as 1-15% of the light of the first sources of light and/or the second sources of light. Further, in specific embodiments amount of light that may escape from an opposite LED filament side may be within the range of about 0.5-35%, such as 1-30% of the light of the fifth sources of light and/or optionally the fourth sources of light. Here, the percentage are the percentages based on the power in Watts within the visible wavelength range.

The intermediate layer, more especially the thermally conductive element may comprise one or more openings and/or may consist of several parts. For instance, in embodiments the thermally conductive element may comprise an elongated layer with openings, especially in the middle of the layer configured in an array. Alternatively or additionally, the thermally conductive element may comprise of several parts, which may be configured parallel, with an opening in between. By configuring the intermediate layer, especially the thermally conductive element and the third light sources, and optionally the fourth light sources, cross-talk of the (blue) third light to luminescent material of the first sources of light or second sources of light may be limited.

Hence, in embodiments the intermediate layer may be an elongated layer comprising a first thermally conductive element part and a second thermally conductive element part with one or more openings between the first thermally conductive element part and the second thermally conductive element part. The first thermally conductive element part and the second thermally conductive element part may be physically coupled to each other, or may be separate elements. Hence, in specific embodiments the first thermally conductive element part and a second thermally conductive element part with one or more openings between the first thermally conductive element part and the second thermally conductive element part may be a monolithic thermally conducive element.

Further, the LED filament device may be functionally coupled to a control system or may comprise a control system. The control system may be external of the LED filament, such as external of the sandwich filament, but may be functionally coupled thereto.

Especially, the control system may control one or more of the of the first sources of light and the second sources of light. The control system may also control one or more of the third sources of light, the fourth sources of light and the fifth sources of light. Even more especially, the control system may control one or more of the of the first sources of light, the second sources of light, the third sources of light, the fourth sources of light and the fifth sources of light. Hence, especially the LED filament device may further comprise a control system. Further, the LED filament device may in embodiments be configured to generate device light comprising one or more of the first white light, the second white light, the blue third light, the green fourth light, and the red fifth light. Especially, in embodiments the control system may be configured to control a spectral power distribution of the device light. Hence, in embodiments the control system is configured to individually control the first sources of light, the second sources of light, the third sources of light, the fourth sources of light, and the fifth sources of light.

As indicated above, the one or more of the first sources of light and the second sources of light may provide white light with different CCTs. When varying the ratio between the first light and the second light, white light may be produces that may be (a bit) off-white, as the color point may be relatively far from the BBL. This may be adapted by adding e.g. green light. Hence, in embodiments the control system may be configured to generate in an operational mode (white) device light comprising (a) one or more of first white light and second white light, and (b) one or more of blue third light, green fourth light, and red fifth light, while maintaining a distance to the black body locus of at maximum 10 SDCM, such as of at maximum 5 SDCM. Further, the CCT may be increased by adding blue light or decreased by adding red light. In specific embodiments, the control system may be configured to generate in an operational mode (a) first white device light (1001) comprising first white light and second white light, and (b) second white device light (1001") comprising blue third light, green fourth light, and red fifth light: wherein the second white device light (1001") has a color point above the black body locus.

In embodiments, in an operational mode the first sources of light in the first set and the third sources of light, and fourth sources of light in the first set may together be configured to provide white device light having a correlated color temperature selected from the range of 2700-4000 K. Hence, with the present invention a large CCT range may be possible, from relatively, selected from the range of 1800-2400 K, to relatively high, like selected from the range of 5500-6500 K.

The lowest correlated color temperature of the device light may especially be based on the light of the first sources of light. However, the correlated color temperature may even be further reduced with admixing e.g. some light of the (optional) fifth sources of light (see also below). The highest correlated color temperature of the device light may especially be based on the light of the second sources of light. However, by admixing some light of the third sources of light, the correlated temperature may even further be increased.

Further, with the present invention the correlated color may be controlled why staying relatively close to the black body locus (BBL). Hence, white light may be provided over a relatively large correlated color temperature range, while staying within 10 SDCM or even less (see also above) from the BBL.

As indicated above, also fifth sources of light may be available. Such fifth sources of light may be configured to generate red light. With the fifth sources of light, optical properties of the device light may further be controlled. The CCT range may be increased, the gamut may be increased, and CRI may also be improved.

In specific embodiments, in an operational mode the first sources of light, the third sources of light, the fourth sources of light, and the fifth sources of light (in the first set may together be configured to provide white (device) light having a correlated color temperature selected from the range of 2700-4000 K, or even larger, such as up to e.g. 4500 K, or yet even larger.

In specific embodiments, in an operational mode the third sources of light, the fourth sources of light, and the fifth sources of light (in the first set may together be configured to provide white (device) light having a correlated color temperature selected from the range of 1900-6500 K, especially with a CCT tunable range of at least 1000 K, such as at least 2000 K.

Here, the term CCT tunable range refers to the range defined between a lowest and the highest correlated color temperature in range wherein the color temperature can be controlled.

In specific embodiments, in an operational mode the second sources of light (in the first set), optionally together with one or more of (i) the third sources of light (in the first set), the fourth sources of light (in the first set), and the optional fifth sources of light (in the first set may together be configured to provide white (device) light having a correlated color temperature selected from the range of 2300-6500 K, especially with a CCT tunable range of at least 1000 K, such as at least 2000 K.

As indicated above, in embodiments the LED filament device may further comprise a luminescent material, wherein the first sources of light are especially based on (a) first light sources configured generate first light source light, and (b) the luminescent material, configured downstream of the first light sources and configured to convert at least part of the first light source light into luminescent material light. Especially, in embodiments the first light comprises the first light source light and the luminescent material light. Further, as indicated above, in embodiments the first light sources comprise solid state light sources. In this way, the first source of light may be based on a luminescent material.

However, also other embodiments may be provided, e.g. to generate the second light, or to generate the third light, or the fourth light or the fifth light.

Referring to the second light, in embodiments the LED filament device may further comprise a luminescent material, wherein the second sources of light are especially based on (a) second light sources configured generate second light source light, and (b) the luminescent material, configured downstream of the second light sources and configured to convert at least part of the second light source light into luminescent material light. Especially, in embodiments the second light comprises the second light source light and the luminescent material light. Further, as indicated above, in embodiments the second light sources comprise solid state light sources. In this way, the second source of light may be based on a luminescent material.

Note that the luminescent material for these luminescent material based embodiments of the second source of light may be different from the luminescent material for the luminescent material based embodiments of first second source of light. However, in embodiments the second light sources for these luminescent material based embodiments of the second source of light may be different from the first light sources for the luminescent material based embodiments of first second source of light, though in other embodiments they may also be of the same type. For instance, would the same type of blue LEDs be used, such as especially from the same bin, the light sources for the first source of light and the light sources for the second source of light may be controlled individually.

Hence, in more general embodiments wherein a source of light may be based on a luminescent material, in embodiments the LED filament device may further comprise a luminescent material, wherein the a source of light is especially based on (a) a light source, especially a solid state light source, configured generate light source light, and (b) the luminescent material, configured downstream of the light sources and configured to convert at least part of the light source light into luminescent material light. Especially, in embodiments the light of the source of light may comprise the luminescent material light, an in specific embodiments also the light source light (when there is no full conversion). In this way, a source of light may be based on a luminescent material.

An encapsulant comprised by the first sources of light may comprise another luminescent material than the encapsulant by the second sources of light. Both encapsulants may comprise in embodiments the same light transmissive material, but with different luminescent material embedded therein. Hence, the first source of light and the second source of light may comprise different encapsulants, which may in embodiments especially differ in luminescent material.

Note that in embodiments wherein the third sources of light may comprise third light sources and the fourth sources of light may comprise fourth light sources. Especially, these may be solid state light sources, which are of different bins and may in embodiments be direct LEDs. Further, as indicated above, in embodiments the fifth light sources may comprise solid state light sources. Note that the fifth light and the fifth light source light may essentially be the same, as the fifth source of light may be the fifth light source, such as a red emitting LED.

In embodiments, the first sources of light comprise first light sources, especially first solid state light sources, which in combination with a luminescent material provide the first light. Further, in embodiments the second sources of light comprises second light sources, especially second solid state light sources, which in combination with a (different) luminescent material provide the second light. The first light sources and the second light sources may be of the same bin. The first light sources and the third light sources may be of the same bin. The second light sources and the third light sources may be of the same bin. The first light sources and the second light source and the third light sources may be of the same bin. The former two may in embodiments be applied in combination with luminescent materials, and the latter may in embodiments be used as source of blue light (third light).

Hence, the LED filament device may comprise first light sources, second light sources, third light sources, and fourth light sources, and optionally fifth light sources. As indicated above, in specific embodiments the first light sources and the second lights sources may be of the same bin. Especially, the first light sources (of at least the first set) may be controlled as (first) subset of first light sources. Especially, the second light sources (of at least the second set) may be controlled as (second) subset of second light sources.

Especially, the third light sources (of at least the third set) may be controlled as (third) subset of third light sources. Especially, the fourth light sources (of at least the fourth set) may be controlled as (fourth) subset of fourth light sources. Especially, the (optional) fifth light sources (of at least the (optional) fifth set) may be controlled as (fifth) subset of (optional) fifth light sources. Especially, all light sources may be solid state light sources. In specific embodiments, a control system may individually control the first, second, third, and fourth subsets, and the optional fifth subset.

The third light sources may be configured to generate third light source light. The third light may essentially be the third light source light. For instance, the third source of light may be a direct LED. The fourth light sources may be configured to generate fourth light source light. The fourth light may essentially be the fourth light source light. For instance, the fourth source of light may be a direct LED. The fifth light sources may be configured to generate fifth light source light. The fifth light may essentially be the fifth light source light. For instance, the fifth source of light may be a direct LED.

Above, a number of embodiments have been described in relation to five sources of light. However, in embodiments the invention may also include embodiments with only first sources of light or only second sources of light. The invention may also include embodiments with five or six sources of light, wherein the fifth sources of light are configured to generate amber light, and not red light, or wherein the fifth sources of light are configured to generate red light and the sixth sources of light are configured to generate amber light. Especially, the any source of light providing colored light may be functionally coupled to the second side.

For instance, in embodiments four types of sources of light may be applied comprising sources of light configured to generate white light (especially first or second sources of light), sources of light configured to generate blue light (third sources of light), source of light configured to generate green light (fourth sources of light), and sources of light configured to generate red light (fifth sources of light).

For instance, in other embodiments five types of sources of light may be applied comprising sources of light configured to generate warm white light (especially first sources of light), sources of light configured to generate cool white (especially second sources of light), sources of light configured to generate blue light (third sources of light), source of light configured to generate lime light (sixth sources of light), and sources of light configured to generate red light (fifth sources of light). Lime light may have one or more wavelengths within the 560-570 nm wavelength range. Especially, lime light may have a centroid wavelength in the 560-570 nm wavelength range, such as about 565 nm.

For instance, in yet other embodiments four types of sources of light may be applied comprising sources of light configured to generate white light (especially first or second sources of light, or both types), sources of light configured to generate blue light (third sources of light), source of light configured to generate green light having a centroid wavelength within the range of 520-560 nm (fourth sources of light), source of light configured to generate cyan light having a centroid wavelength within the range of 480-520 nm, such as 490-520 nm (also fourth sources of light), and sources of light configured to generate red light (fifth sources of light).

Other embodiments, however, may also be possible.

In an aspect, the invention also provides an LED filament device comprising (i) a first LED filament side, (ii) a second LED filament side, (iii) an intermediate layer, and (iv) a plurality of sources of light. Especially, in embodiments a first set of sources of light are associated to the first filament side. In specific embodiments, at least a first subset of these sources of light of the first set are configured to generate light. Especially, the light of this first subset of sources of light may be white light. In specific embodiments, a second set of sources of light are associated to the second filament side. Especially, in embodiments at least a second subset of these sources of light of the second set are configured to generate light. In embodiments, the light of this second subset of sources of light may be colored light (second colored light). Further, in specific embodiments at least a third subset of these sources of light of the second set are configured to generate light. In embodiments, the light of this third subset of sources of light may be colored light (third colored light), having a spectral power distribution different from the light of this second subset of sources of light. Yet further, in embodiments the first LED filament side, the second LED filament side, and (iii) the intermediate layer may be comprised by a sandwich arrangement. Especially, the intermediate layer is configured between at least part of the first LED filament side and at least part of the second LED filament side. Further, in specific embodiments the intermediate layer may comprise a first thermally conductive element part and a second thermally conductive element part with one or more openings between the first thermally conductive element part and the second thermally conductive element part. In embodiments (see also above), the first thermally conductive element part and a second thermally conductive element part may form a monolithic thermally conductive element. Therefore, in specific embodiments the invention also provides an LED filament device comprising (i) a first LED filament side, (ii) a second LED filament side, (iii) an intermediate layer, and (iv) a plurality of sources of light, wherein: (a) a first set of sources of light are associated to the first filament side, wherein at least a first subset of these sources of light of the first set are configured to generate light, wherein the light of this first subset of sources of light is white light: (b) a second set of sources of light are associated to the second filament side, wherein at least a second subset of these sources of light of the second set are configured to generate light, wherein the light of this second subset of sources of light is colored light (second colored light): (c) wherein at least a third subset of these sources of light of the second set are configured to generate light, wherein the light of this third subset of sources of light is colored light (third colored light), having a spectral power distribution different from the light of this second subset of sources of light: (d) the first LED filament side, the second LED filament side, and (iii) the intermediate layer are comprised by a sandwich arrangement, wherein the intermediate layer is configured between at least part of the first LED filament side and at least part of the second LED filament side; and (e) the intermediate layer comprises a first thermally conductive element part and a second thermally conductive element part with one or more openings between the first thermally conductive element part and the second thermally conductive element part.

As will be clear from the above, the sandwich LED filament may in embodiments comprise a single (folded)

support and may in other embodiments comprise two supports. The folded support may in embodiments comprise one or two bents. As indicated above, the support may in embodiments be flexible.

Especially, the LED filament device is configured to generate LED filament device light. Further, in embodiments the spectral properties of the filament device light may be controllable. For instance, one or more of CRI, CCT, and color point may be controlled.

Hence, in embodiments the LED filament device may further comprises a control system, or may be functionally coupled to a control system. Especially, the control system may be configured to control one or more of a spectral power distribution, color rendering index, correlated color temperature, and color point of the filament device light by individually controlling one or more of the first sources of light, the second sources of light, the third sources of light, the fourth sources of light, and optionally the fifth sources of light.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system. Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability). Hence, in embodiments, the control system may control in dependence of one or more of an input signal of a user interface, a sensor signal (of a sensor), and a timer. The term "timer" may refer to a clock and/or a predetermined time scheme. The control system may be used to control the filament light in operational modes in different colors or different correlated color temperatures. Different colors or different color temperatures especially imply different color points.

In embodiments, in a first operational mode, the LED filament device may be configured to generate filament light having a CCT of at maximum 2400 K, such as at maximum 2300 K, like at maximum 2000 K, such as selected from the range of 1800-2300 K, like selected from the range of 1800-2100 K, while in further specific embodiments have a color point within 10 SDCM from the BBL. In embodiments in a second operational mode, the LED filament device may be configured to generate filament light having a CCT of at minimum 2700 K, such as at minimum 3000 K, like in embodiments at minimum 3500 K, such as selected from the range of 2700-6500 K, like selected from the range of 3000-6500 K, while in further specific embodiments having a color point within 10 SDCM from the BBL. Especially, the CRI may be at least 80, such as at least 85.

In embodiments, in an operational mode (cool) white light may be provided by the second sources of light only. In other embodiments, in an operational mode (cool) white light may be provided by the second sources of light and optionally one or more of the third sources of light and the fourth sources of light. In this way, the CCT may be controllable while staying relatively close the BBL. Further, in this way, the CCT may be at least 2700 K, or (much) higher: see also above. In embodiments, in an operational mode (warm) white light may be provided by the first source of light only. In other embodiments, in an operational mode (warm or even warmer) white light may be provided by the first sources of light and the fifth sources of light. Further, in this way the CCT may be low, such as at maximum 2400 K, or (substantially) lower, such as even below 2200 K, like below 2100 K.

Some further embodiments are described below.

Further, in specific embodiments the LED filament may have a spiral shape or a helical shape. This may especially be useful when applying in retrofit lamps. Such lamps may comprise one or more of the LED filaments.

As indicated above, the LED filament may comprise a (light transmissive) encapsulant which may at least partly enclose the solid state light source(s), especially at least enclose the light emitting surface(s) of the solid state light sources(s), such as the die(s). The encapsulant may comprise a light transmissive material. Especially, in embodiments the light transmissive material may comprise polymeric material, such as a resin. Alternative embodiments, however, may also be possible. In specific embodiments the light transmissive material may comprise a luminescent material (see also above). Alternatively or additionally, in specific embodiments the light transmissive material may comprise a light scattering material. In further specific embodiments, the light transmissive material may comprise a light transmissive host material, like a polymeric material, such as a resin, and the luminescent material. The luminescent material may be embedded in the light transmissive host material. In further specific embodiments, the light transmissive material may comprise a light transmissive host material, like a polymeric material, such as a resin, and a scattering material. The scattering material may be embedded in the light transmissive material. The scattering material may comprise light reflective particles. Instead of the term "light transmissive material" also the term "optically transmissive material" may be applied.

In embodiments, all light solid state light sources may be at least partly embedded in the light transmissive material. In other embodiments, a subset of the solid state light sources may at least partly be embedded in the light transmissive material. Especially, the term "partly embedded" may indicated that light escaping from the solid state light sources can substantially only escape via the light transmissive material.

When the light transmissive material comprises scattering material, and no luminescent material, in embodiments all solid state light sources may be partly embedded in the light transmissive material. When the light transmissive material comprises luminescent material, the solid state light sources of which the light is at least partly converted by the luminescent material, may be partly embedded. However, also other solid state light sources may be partly embedded in the light transmissive material, when the light transmissive material is substantially transmissive for the light of such other light generating devices.

In embodiments, one or more, especially all, of the first (solid state) light sources may be embedded in a light transmissive material. Alternatively or additionally, one or more, especially all, of the second (solid state) light sources may be embedded in a light transmissive material. Alternatively or additionally, one or more, especially all, of the fifth (solid state) light sources may be embedded in a light transmissive material.

LED filaments as such are known, and are e.g. described in U.S. Pat. No. 8,400,051 B2, WO2020016058, WO2019197394, etc., which are herein incorporated by reference. U.S. Pat. No. 8,400,051 B2, for instance, incorporated herein by reference, describes a light-emitting device comprising: an elongated bar-shaped package with left and right ends, the package being formed such that a plurality of leads are formed integrally with a first resin with part of the leads exposed: a light-emitting element that is fixed onto at least one of the leads and that is electrically connected to at least one of the leads; and a second resin sealing the light-emitting element, wherein the leads are formed of metal, an entire bottom surface of the light-emitting element is covered with at least one of the leads, an entire bottom surface of the package is covered with the first resin, the first resin has a side wall that is integrally formed with a portion covering the bottom surface of the package and that is higher than upper surfaces of the leads, the first resin and the second resin are formed of optically transparent resin, the second resin that is filled to a top of the side wall of the first resin and that includes a fluorescent material having a larger specific gravity than that of the second resin, the leads have outer lead portions that are used for external connection and that protrude in a longitudinal direction of the package from the left and right ends wherein the fluorescent material is arranged to concentrate near the light emitting element, and is excited by part of light emitted by the light-emitting element so as to emit a color different from a color of the light emitted by the light-emitting element, and the side wall transmits part of light that is emitted by the light-emitting element and that enters the side wall and part of light emitted from the fluorescent material to the portion covering the bottom surface of the package.

In embodiments, one or more filaments, especially all filaments, may have a substantial straight shape. In yet other embodiments, one or more filaments, especially all filaments, may have a curved shape. In yet other embodiments, one or more filaments, especially all filaments, may have a spiral shape. In yet other embodiments, one or more filaments, especially all filaments, may have a helical shape. When two or more filaments have spiral shapes or helical shapes, in embodiments two of these may have similarly configured windings. Other shaped filaments may also be possible, such as having the shape of characters, such as of letters, of numbers, of flowers, of leaves, or other shapes. Especially, in embodiments the filament(s) has (have) a spiral shape or a helical shape.

The light generating device may in general comprise a light transmissive envelope ("bulb"), such as a light transparent envelope, such as in embodiments a glass envelope. The envelope may at least partly, even more especially substantially, enclose the one or more filaments. The light transmissive envelop may have an envelope height (e.g. defined by the standard shapes B35, A60, ST63, G90, etc.). The first supporting structure may have e length of at least 20% of the height light transmissive envelope, such as in embodiments up to about 80%. Especially, the envelope is transparent for (visible) light.

Further, the light generating device may comprise a screw cap, like of the type E27, though other connectors, for e.g. connecting to a socket, may also be possible.

In yet a further aspect, the invention also provides a LED filament device as defined herein, wherein the LED filament device is a retrofit lamp. In yet a further aspect, the invention also provides a lamp or a luminaire comprising the LED filament device as defined herein. The luminaire may further comprise a housing, optical elements, louvres, etc. etc. The lamp or luminaire may further comprise a housing enclosing the light generating device. The lamp or luminaire may comprise a light window in the housing or a housing opening, through which the system light may escape from the housing.

Especially, in embodiments the invention provides a LED filament device as defined herein, wherein the LED filament device is a retrofit lamp; and wherein the LED filament has a spiral shape or a helical shape.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
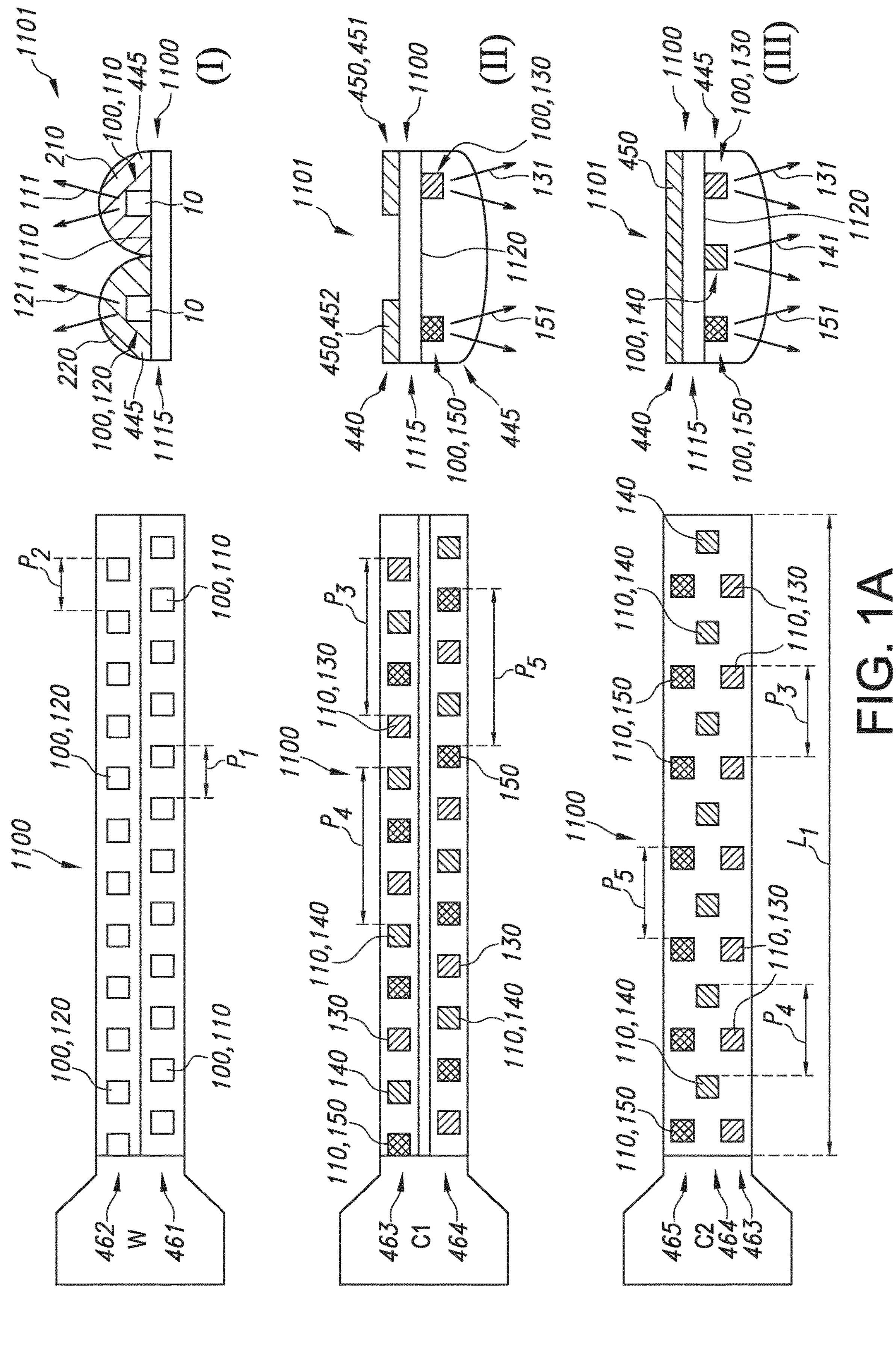
FIGS. 1*a*-1*f* schematically depict some embodiments and aspects.

FIG. 1*a* schematically depicts embodiments of single sided LED filaments 1100, having sources of light 100 at essentially a single side. The sources of light 100 may comprise first sources of light 110, second sources of light 120, third sources of light 130, fourth sources of light 140, and fifth sources of light 150. On the lift in FIG. 1*a*, cross-sectional views in the plane of the LED filament 1100 are schematically depicted: on the right in FIG. 1*a*, cross-sectional views parallel to the plane of the LED filaments 1100 are schematically depicted.

In embodiments, the first sources of light 110 may be configured to generate first white light 111 having a first correlated color temperature CCT1. Especially, the first sources of light 110 are associated to the first filament side 1110. In embodiments, the second sources of light 120 may be configured to generate second white light 121 having a second correlated color temperature CCT2. Especially, the second sources of light 120 are associated to the first filament side 1110. Especially, in embodiments CCT2−CCT1≥500 K. In embodiments, the third sources of light 130 may be configured to generate blue third light 131. In embodiments, the third sources of light 130 are associated to the second filament side 1120. In embodiments, the fourth sources of light 140 may be configured to generate green fourth light 141. In embodiments, the fourth sources of light 140 are associated to the second filament side 1120. In embodiments, the fifth sources of light 150 may be configured to generate red fifth light 151. In embodiments, the fifth sources of light 150 are associated to the second filament side 1120.

References 461 and 462 indicates columns in which the respective first sources of light 110 and second sources of light 120 may be configured. Note that the first sources of light 110 and second sources of light may also be distributed over both columns 461, 462.

References P1, P2, P3, P4, P5 indicate the respective pitches for the first sources of light 110, second sources of light 120, third sources of light 130, fourth sources of light 140, and fifth sources of light 150. References 111, 121, 131,141, 151 refers to the respective light of the respective first sources of light 110, second sources of light 120, third sources of light 130, fourth sources of light 140, and fifth sources of light 150. Reference 1101 indicates LED filament light.

Embodiment I (W) schematically depicts the first sources of light 110 and the second sources of light 120 each based on solid state light sources 10, which may be of the same bin, but which may also be of different bins, which are configured to generate light source light that is at least partly converted by respective first luminescent material 210 and second luminescent material 220 into luminescent material light (having different spectral power distributions for the first luminescent material light and the second luminescent material light). Hence, the solid state light sources 10 are at least encapsulated with light transmissive material, which may in embodiments be the same for both sources of light, but wherein respectively embedded the luminescent materials 210, 220.

The first light 111 may comprise first luminescent material light of the first luminescent material 210, and optionally light source light of the (respective) solid state light source light. The second light 121 may comprise second luminescent material light of the second luminescent material 220, and optionally light source light of the (respective) solid state light source light. Reference 445 indicates light transmissive material, like silicone, in which the respective luminescent materials may be embedded.

Reference 1110 indicates a first filament side of the LED filament 1100.

Embodiment II (C1) schematically depicts an embodiment wherein the third sources of light 130, fourth sources of light 140, and fifth sources of light 150 are distributed over two columns 463, 464. The sources of light 100 are at least partly embedded in a light transmissive material 445, such as silicone. Scattering particles (not shown) may be comprised in the silicone. Reference 440 indicates the intermediate layer (which is here not yet an intermediate layer, see FIG. 1*b*), which comprises two separate parts, which each comprise (part of) a thermally conductive element 450. The thermally conductive element may comprise one or more parts, which may optionally be functionally coupled (such as being part of the same monolithic thermally conductive element): the parts are indicated with references 451 and 452, respectively.

Embodiment III (C2) schematically depicts an embodiment wherein the third sources of light 130, fourth sources of light 140, and fifth sources of light 150 are configured over three different columns 463, 464, 465. The sources of light 100 are at least partly embedded in a light transmissive material 445, such as silicone. Scattering particles (not shown) may be comprised in the silicone. Reference 440 indicates the intermediate layer (which is here not yet an intermediate layer, see FIG. 1*b*), which comprises an integral element which comprises a thermally conductive element 450 (and which may comprise holes (not depicted, but see FIG. 1*d*)).

Hence, in embodiments II and III the third sources of light 130, fourth sources of light 140, and fifth sources of light

150 are encapsulated by the same encapsulant. Reference 1120 indicates a second filament side of the LED filament 1100.

Reference L1 indicates the length of the LED filament.

Figure 1B:
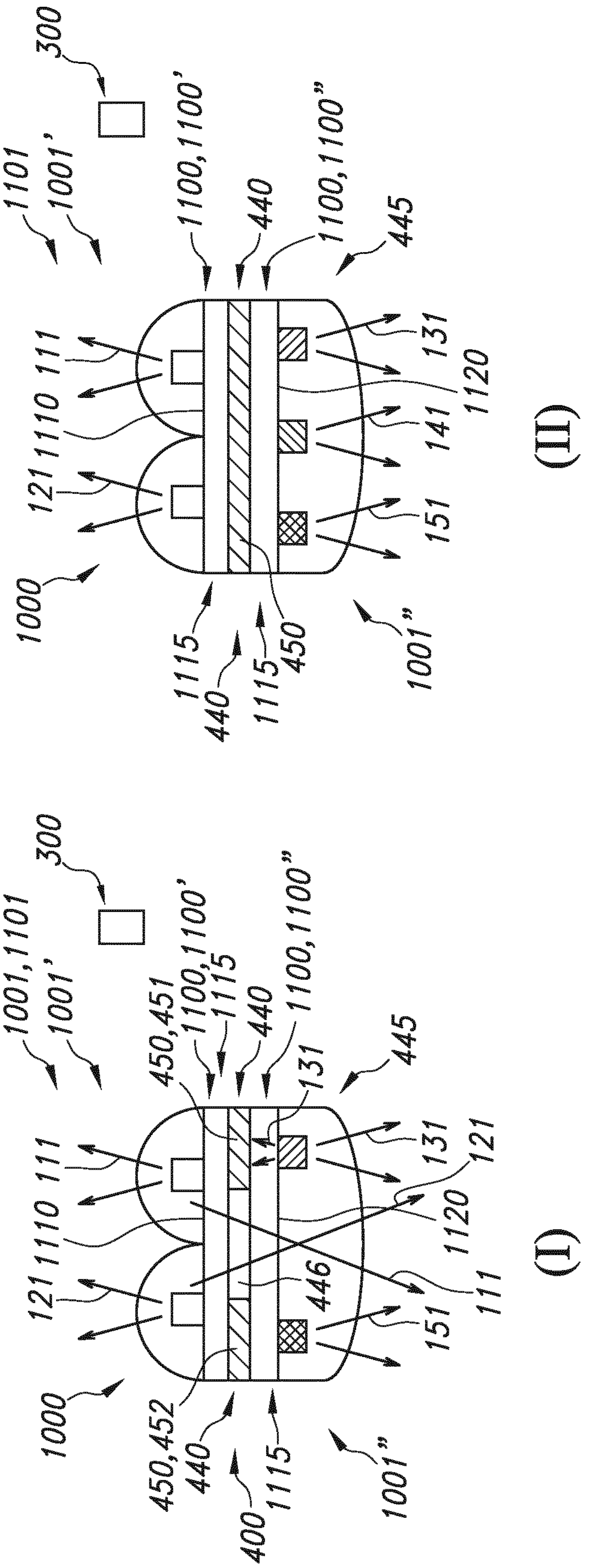

FIG. 1*b* schematically two embodiments of combinations of embodiments schematically depicted in FIG. 1*a*. Embodiment I schematically depicts a sandwich arrangement 400 obtained when combining embodiments I (W) and II (C1) of FIG. 1*a*, and embodiment II schematically depicts a sandwich arrangement 400 obtained when combining embodiments I (W) and III (C2) of FIG. 1*a*.

Hence, embodiments I and II of FIG. 1*b* (and also FIG. 1*c*: see further below) schematically depict embodiments of a LED filament device 1000 comprising a first LED filament side 1110, a second LED filament side 1120, an intermediate layer 440, and a plurality of sources of light 100.

Especially, in embodiments the first sources of light 110 may be configured to generate first white light 111 having a first correlated color temperature CCT1. In embodiments, the first sources of light 110 are associated to the first filament side 1110. In embodiments, the second sources of light 120 may be configured to generate second white light 121 having a second correlated color temperature CCT2. In embodiments, the second sources of light 120 are associated to the first filament side 1110. In embodiments, CCT2−CCT1≥500 K. In embodiments, the third sources of light 130 may be configured to generate blue third light 131. In embodiments, the third sources of light 130 are associated to the second filament side 1120. In embodiments, the fourth sources of light 140 may be configured to generate green fourth light 141. In embodiments, the fourth sources of light 140 are associated to the second filament side 1120. In embodiments, the fifth sources of light 150 may be configured to generate red fifth light 151. In embodiments, the fifth sources of light 150 are associated to the second filament side 1120.

In embodiments, the intermediate layer 440 may comprises a thermally conductive element 450.

In embodiments, the first LED filament side 1110, the second LED filament side 1120, and the intermediate layer 440 may be comprised by a sandwich arrangement 400, wherein the intermediate layer 440 is configured between at least part of the first LED filament side 1110 and at least part of the second LED filament side 1120.

The LED filament device 1000 may further comprising a light transmissive material 445. Especially, the fourth sources of light 140 and the fifth sources of light 150, and optionally the third sources of light 130, may be configured at least partly embedded in the light transmissive material 445. Further, in embodiments the light transmissive material 445 is transmissive for the blue third light 131, the green fourth light 141, and the red fifth light 151. Especially in embodiments the light transmissive material 445 is translucent. In this way the light of the sources of light may be mixed.

In embodiments, the light transmissive material 445 comprises a silicone material comprising scattering particles. In embodiments, the intermediate layer 440 comprises a metal layer. In embodiments, the intermediate layer 440 comprises one or more of (i) a copper layer and (ii) an aluminum layer. In embodiments, the metal layer and the sources of light 100 are not configured in electrically conductive contact.

Referring to embodiments I and II in FIG. 1*b*, the intermediate layer 440 may be one or more of reflective and light absorbing for one or more of the blue third light 131 and the green fourth light 141, especially at least the former.

Referring to embodiment I in FIG. 1*b* (and in variants also to embodiment II in FIG. 1*b*, see also FIG. 1*d*), in embodiments, the LED filament device 1000 comprising the intermediate layer 440 may be configured such that part of one or more of the first white light 111, second white light 121 escapes from the sandwich arrangement 400 via the second LED filament side 1120. To this end, the intermediate layer 440, especially the thermally conductive element 450, may comprise one or more openings 446 or light transmissive material.

Referring to the embodiments of FIG. 1*b*, two LED filaments 1100 may be applied. Hence, in embodiments, the LED filament device 1000 comprises a first LED filament 1100' defining the first LED filament side 1110 and a second LED filament 1100" defining the second LED filament side 1120. Especially, the first filament 1100 and the second filament 1100" may be comprised by the sandwich arrangement 400. Further, the intermediate layer 440 may be configured between at least part of the first LED filament side 1110 and at least part of the second LED filament side 1120. Especially, the first LED filament 1100' and the second LED filament 1100" comprise supports 1115, wherein at least part of each of the supports 1115 are light transmissive for one or more of the first white light 111 and the second white light 121. In embodiments, the intermediate layer 440 is configured between part of the first LED filament 1100' and part of the second LED filament 1100".

In embodiments, CCT1 is selected from the range of at maximum 2400 K and wherein CCT2 is selected from the range of at least 2700 K. In embodiments, CCT1 is selected from the range of at maximum 1900-2400 K, CCT2 is selected from the range of 2700-6500 K, and CCT2−CCT1≥1000 K.

Reference 300 refers to a control system. Hence, in embodiments the device 1000 may further comprise a control system 300. Especially, the control system 300 is configured to control a spectral power distribution of the device light 1001.

In embodiments, the LED filament device 1000 is configured to generate device light 1001 comprising one or more of the first white light 111, the second white light 121, the blue third light 131, the green fourth light 141, and the red fifth light 151. In embodiments, the control system 300 is configured to individually control the first sources of light, the second sources of light, the third sources of light, the fourth sources of light, and the fifth sources of light. Further, in embodiments, the control system 300 may be configured to generate in an operational mode a first white device light 1001' comprising first white light 111 and second white light 121, and b second white device light 1001" comprising blue third light 131, green fourth light 141, and red fifth light. In embodiments, the second white device light 1001" has a color point above the black body locus.

Further, in embodiments, the device 1000, more especially the LED filament 1100, may comprise at least five of each of the first sources of light 110, the second sources of light 120, the third sources of light 130, the fourth sources of light 140, and the fifth sources of light 150, wherein each of the first sources of light 110, the second sources of light 120, the third sources of light 130, the fourth sources of light 140, and the fifth sources of light 150 comprise solid state light sources 10. In embodiments, the first sources of light 110 and the second sources of light 120 may be configured in two parallel rows 461, 462, and wherein the third sources of light 130, the fourth sources of light 140, and the fifth sources of light 150 may be configured in two or three parallel rows 463, 464, 465.

Figure 1C:
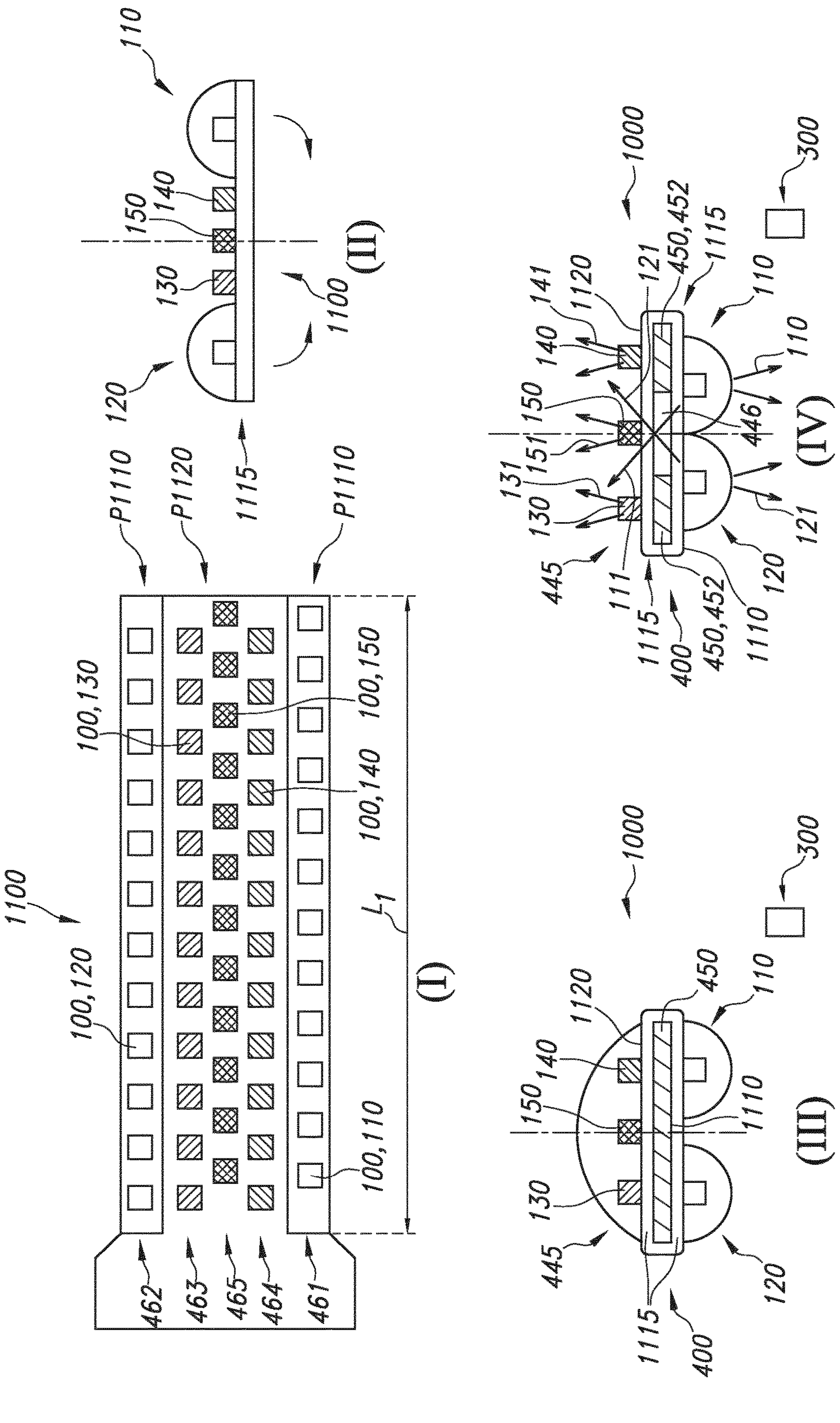

Referring to FIG. 1*c*, embodiment I schematically depicts a cross-sectional view in the plane of the LED filament 1100 and embodiment II schematically depicts a cross-sectional view perpendicular to the plane of the LED filament 1100. Embodiments III and IV schematically depict embodiments wherein this LED filament is folded to provide the side with the sources of light 100 in fact at two LED filament sides, with intermediate layer 440 configured in between. In fact, the support 1115 is folded at both right and left ends (see embodiment II), and possible obtained sandwich arrangement in embodiments III and IV (including intermediate layer 440). Hence, in embodiments, the LED filament device 1000 comprises a LED filament 1100, wherein the LED filament 1100 is configured fold in half, defining the first LED filament side 1110 and the second LED filament side 1120 configured opposite of each other. Especially, the intermediate layer 440 configured between at least part of the first LED filament side 1110 and at least part of the second LED filament side 1120.

Further, referring to FIG. 1*c*, in embodiments, the LED filament 1000 comprises a support 1115, wherein at least part of the support 1115 is light transmissive for one or more of the first white light 111 and the second white light 121. In embodiments, the intermediate layer 440 is configured between part of the first LED filament side 1110 and part of the second LED filament side 1120. More especially, the intermediate layer may be configured between two parts of the LED filament 1100, indicated with references P1110 and P1120. In this schematically depicted embodiments, part P1110 may effectively comprise two parts. However, other solutions and arrangements of the sources of light 100 may also be possible. The folded support 1115 may in embodiments comprise one or two bents. FIG. 1*c* schematically depict embodiments with two bents.

Figure 1E:
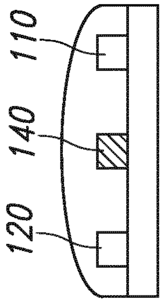
Figure 1D:
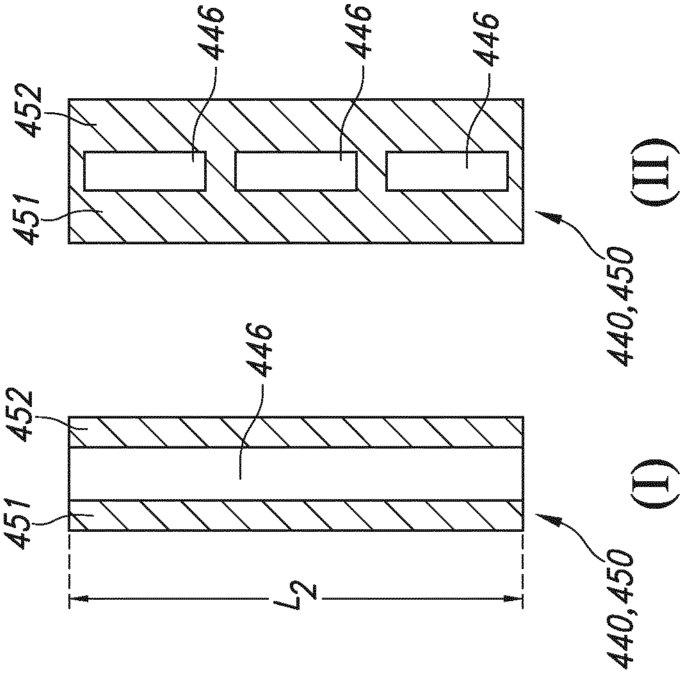

FIG. 1*d* schematically depict two embodiments of the intermediate layer 440. Especially, the intermediate layer is an elongated layer having a length L2 which may be in the range of 85-115%, especially 85-100%, of the length of the LED filament L1. Here, the intermediate layer comprises one or more holes 446 or light transmissive material. Especially, the intermediate layer may be provided by providing two or more parts with light transmissive material or holes therein, such as in between two parts. In these embodiments, by way of example the intermediate layer 440 is an elongated layer comprising a first thermally conductive element part 451 and a second thermally conductive element part 452 with one or more openings 453 between the first thermally conductive element part 451 and the second thermally conductive element part 452.

FIG. 1*e* schematically depicts another solution, with a single side LED filament with first sources of light 110, second sources of light 120, and fourth sources of light 140. However, this solution has a substantially smaller color gamut that the solutions as schematically depicted in FIGS. 1*a*-1*c*.

Figure 1F:
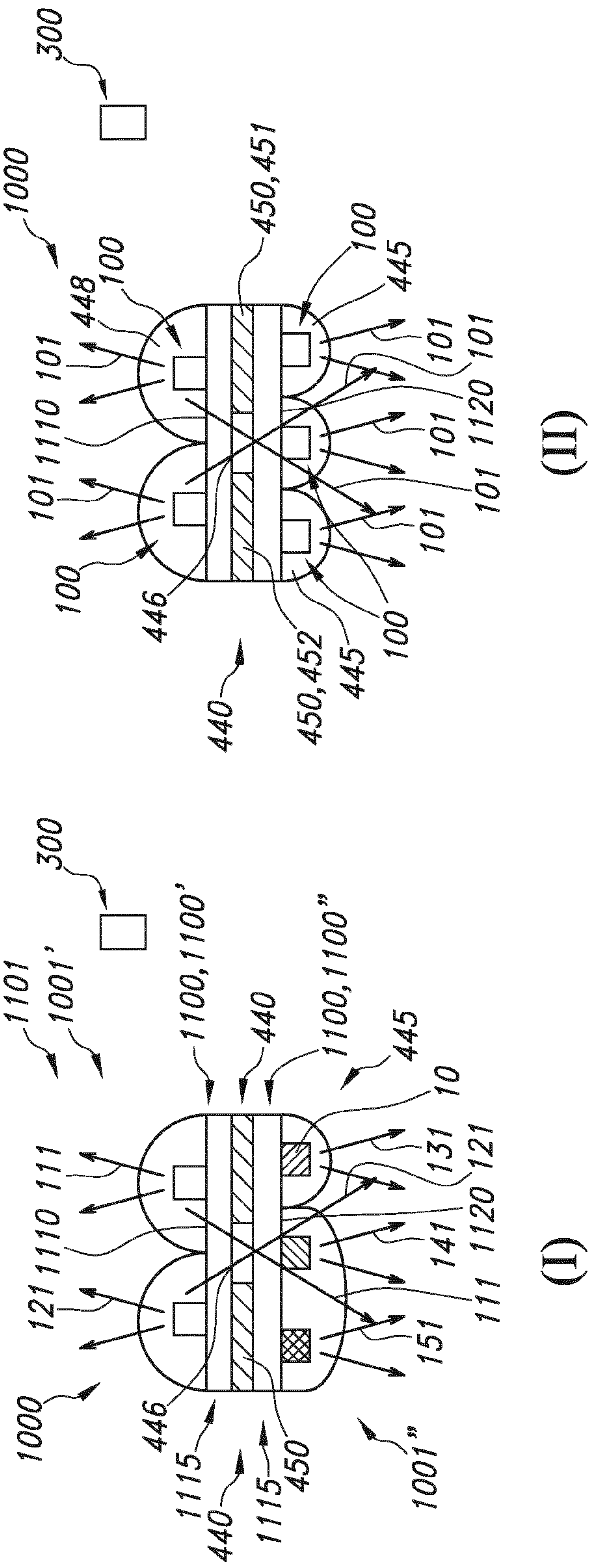

FIG. 1*f* schematically depicts in embodiment I, a solution wherein the third sources of light 130 are based on solid state light sources 10 which are embedded in light transmissive material 445 in such a way that the outer sources of light, or more especially their solid state light sources, may also be embedded in light transmissive material 445, but in substantially another body of light transmissive material 445. Hence, at least two bodies of light transmissive material may be provided, which may further prevent cross-talk of the third light 131 to the other side (here from the second side 1120 to the first side 1110).

FIG. 1*f* schematically depicts in embodiment II an embodiments of an LED filament device 1000 comprising (i) a first LED filament side 1110, (ii) a second LED filament side 1120, (iii) an intermediate layer 440, and (iv) a plurality of sources of light 100. In embodiments, a first set of sources of light 100 are associated to the first filament side 1110, wherein at least a first subset of these sources of light 100 of the first set are configured to generate light 101, wherein the light 101 of this first subset of sources of light is white light. Further, in embodiments a second set of sources of light 100 are associated to the second filament side 1120, wherein at least a second subset of these sources of light 100 of the second set are configured to generate light 101, wherein the light 101 of this second subset of sources of light is colored light second colored light. Yet further, in embodiments at least a third subset of these sources of light 100 of the second set are configured to generate light 101, wherein the light 101 of this third subset of sources of light is colored light third colored light, having a spectral power distribution different from the light of this second subset of sources of light. Yet further in embodiments, the first LED filament side 1110, the second LED filament side 1120, and the intermediate layer 440 are comprised by a sandwich arrangement 400, wherein the intermediate layer 440 is configured between at least part of the first LED filament side 1110 and at least part of the second LED filament side 1120. Further, in embodiments the intermediate layer 440 comprises a first thermally conductive element part 451 and a second thermally conductive element part 452 with one or more openings 453 between the first thermally conductive element part 451 and the second thermally conductive element part 452.

Figure 2:
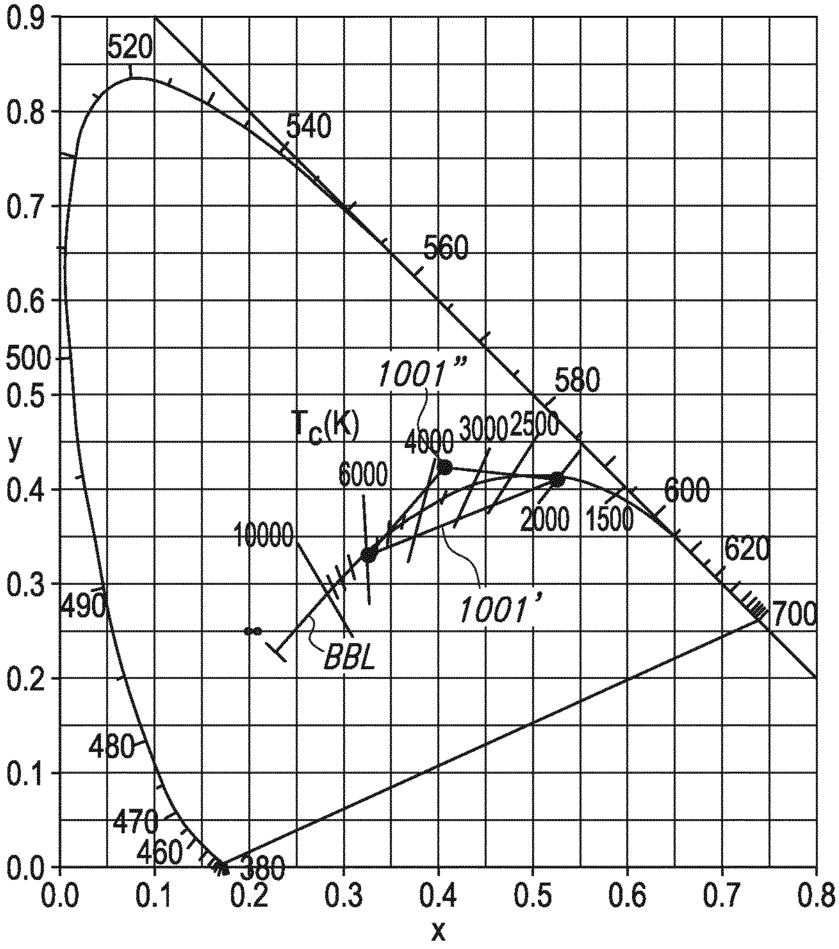
FIG. 2 schematically depicts an embodiment of an application.

Referring to also FIG. 2, but also to FIGS. 1*a*-1*c*, in embodiments the control system 300 is configured to generate in an operational mode device light 1001 comprising (a) one or more of first white light 111 and second white light 121, and (b) one or more of blue third light 131, green fourth light 141, and red fifth light, while maintaining a distance to the black body locus of at maximum 10 SDCM.

Figure 3:
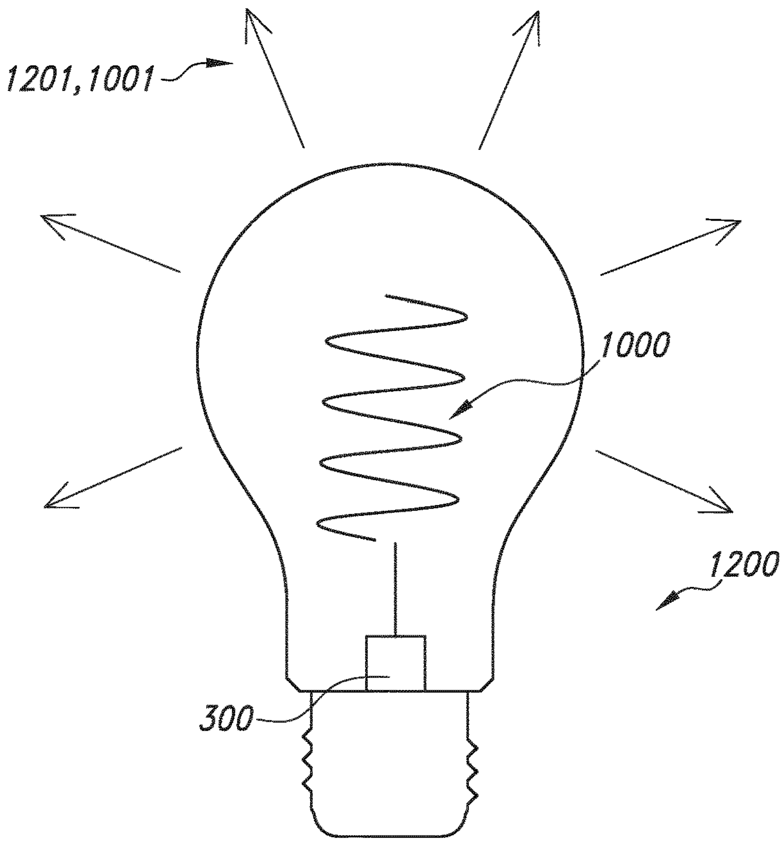
FIGS. 3 and 4 schematically depict further embodiments and applications.

FIG. 3 also schematically depicts an embodiment of a lighting device 1200, comprising the LED filament device 1000. The lighting device 1200 may be a retrofit lamp. Further, an embodiment is depicted wherein the filament 1100 has a spiral shape or a helical shape.

Referring to FIG. 3, the LED filament device 1000 is configured to generate LED filament device light 1001. The lighting device 1200 may thus further comprise a control system 300 configured to control one or more of a spectral power distribution, color rendering index, correlated color temperature, and color point of the filament device light 1001 by individually controlling one or more of the first sources of light 110, the second sources of light 120, and one or more of the third sources of light 130, the fourth sources of light 140, and the fifth sources of light 150, and the sixth sources of light, and optionally further sources of light.

The lighting device 1200 may comprise a light transmissive envelope enclosing at least part of the LED filament device 1000.

Figure 4:
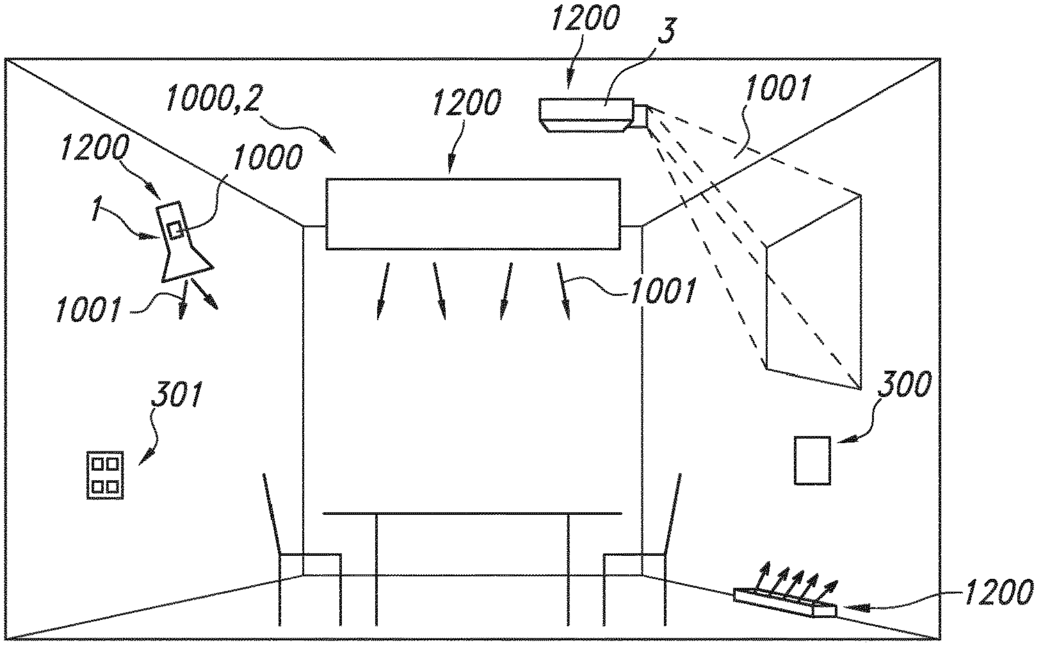

FIG. 4 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 5 also schematically depicts an embodiment of lamp 1 comprising the light generating system 1000. Reference 3 indicates a projector device or projector system, which may be used to project images, such as at a wall, which may also comprise the light generating system 1000. The lamp or luminaire or projector device are herein also indicated as lighting device 1200.

The term "plurality" refers to two or more. The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense: that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A LED filament device comprising (i) a first LED filament side, (ii) a second LED filament side, (ii) an intermediate layer, and (iv) a plurality of sources of light, wherein:

first sources of light are configured to generate first white light having a first correlated color temperature CCT1; wherein the first sources of light are associated to the first filament side;

second sources of light; are configured to generate second white light having a second correlated color temperature CCT2; wherein the second sources of light are associated to the first filament side; wherein CCT2−CCT1≥500 K;

third sources of light are configured to generate blue third light; wherein the third sources of light are associated to the second filament side;

fourth sources of light are configured to generate green fourth light;

wherein the fourth sources of light are associated to the second filament side;

fifth sources of light are configured to generate red fifth light; wherein the fifth sources of light are associated to the second filament side;

the intermediate layer comprises a thermally conductive element;

the first LED filament side, the second LED filament side, and the intermediate layer are comprised by a sandwich arrangement, wherein the intermediate layer is configured between at least part of the first LED filament side and at least part of the second LED filament side;

wherein the first LED filament side only comprises the first and second sources of light, and the second LED filament side only comprises the third, fourth and fifth sources of light.

2. The LED filament device according to claim 1, further comprising a light transmissive material, wherein the fourth sources of light and the fifth sources of light, and optionally the third sources of light, are configured at least partly embedded in the light transmissive material, wherein the light transmissive material is transmissive for the blue third light, the green fourth light, and the red fifth light, and wherein the light transmissive material is translucent.

3. The LED filament device according to claim 1, wherein the intermediate layer comprises a metal layer or a carbon layer.

4. The LED filament device according to claim 3, wherein the intermediate layer comprises one or more of (i) a copper layer and (ii) an aluminum layer; and wherein the metal layer and the sources of light are not configured in electrically conductive contact.

5. The LED filament device according to claim 1, wherein the intermediate layer is one or more of (i) reflective and (ii) light absorbing for one or more of (a) the blue third light and (b) the green fourth light; wherein the LED filament device comprising the intermediate layer is configured such that part of one or more of the first white light and second white light escapes from the sandwich arrangement via the second LED filament side.

6. The LED filament device according to claim 1, wherein the LED filament device comprises a LED filament, wherein the LED filament is configured fold in half, defining the first LED filament side and the second LED filament side configured opposite of each other.

7. The LED filament device according to claim 5, wherein the LED filament comprises a support, wherein at least part of the support is light transmissive for one or more of the first white light and the second white light; and wherein the intermediate layer is configured between part of the first LED filament side and part of the second LED filament side.

8. The LED filament device according to claim 1, wherein the LED filament device comprises a first LED filament defining the first LED filament side and a second LED filament defining the second LED filament side, wherein the first filament and the second filament are comprised by the sandwich arrangement.

9. The LED filament device according to claim 5, wherein the first LED filament and the second LED filament comprise supports, wherein at least part of each of the supports are light transmissive for one or more of the first white light and the second white light; wherein the intermediate layer is configured between part of the first LED filament and part of the second LED filament.

10. The LED filament device according to claim 5, wherein the intermediate layer is an elongated layer comprising a first thermally conductive element part and a second thermally conductive element part with one or more openings between the first thermally conductive element part and the second thermally conductive element part.

11. The LED filament device according to claim 1, wherein CCT1 is selected from the range of at maximum 1900-2400 K, CCT2 is selected from the range of 2700-6500 K, and CCT2−CCT1≥1000 K.

12. The LED filament device according to claim 1, further comprising a control system; wherein the LED filament device is configured to generate device light comprising one or more of the first white light, the second white light, the blue third light, the green fourth light, and the red fifth light, wherein the control system is configured to control a spectral power distribution of the device light.

13. The LED filament device according to claim 12, wherein the control system is configured to individually control the first sources of light, the second sources of light, the third sources of light, the fourth sources of light, and the fifth sources of light.

14. The LED filament device according to claim 12, wherein the control system is configured to generate in an operational mode (a) first white device light comprising first white light and second white light, and (b) second white device light comprising blue third light, green fourth light, and red fifth light; wherein the second white device light has a color point above the black body locus.

15. A lighting device, wherein the lighting device is a retrofit lamp comprising a light transmissive envelope enclosing at least part of the LED filament device according to claim 1.

* * * * *